United States Patent [19]

Arlington et al.

[11] Patent Number: 5,121,500

[45] Date of Patent: Jun. 9, 1992

[54] PRELIMINARY POLLING FOR IDENTIFICATION AND LOCATION OF REMOVABLE/REPLACEABLE COMPUTER COMPONENTS PRIOR TO POWER-UP

[75] Inventors: David L. Arlington, Eggertsville; Jacqueline K. Morris, Binghamton; Hehching H. Li, Endicott; Jerry K. Radcliffe, Owego, all of N.Y.

[73] Assignee: International Business Machines Corporation, Armonk, N.Y.

[21] Appl. No.: 701,308

[22] Filed: May 13, 1991

Related U.S. Application Data

[63] Continuation of Ser. No. 292,199, Dec. 30, 1988, abandoned.

[51] Int. Cl.⁵ .......................... G06F 1/26; G06F 13/00
[52] U.S. Cl. ................................. 395/750; 364/273.5; 364/268.9; 364/285.4
[58] Field of Search ... 364/200 MS File, 900 MS File; 371/11.1, 11.3, 14, 66

[56] References Cited

U.S. PATENT DOCUMENTS

| | | | |
|---|---|---|---|
| 4,495,568 | 1/1985 | Gilbert et al. | 364/200 |
| 4,556,953 | 12/1985 | Caprio et al. | 364/900 |
| 4,660,141 | 4/1987 | Ceccon et al. | 364/200 |
| 4,760,553 | 7/1988 | Buckley et al. | 364/900 |
| 4,775,931 | 10/1988 | Dickie et al. | 364/200 |
| 4,792,955 | 12/1988 | Johnson et al. | 371/11.1 |
| 4,809,163 | 2/1989 | Hirosawa et al. | 364/200 |

FOREIGN PATENT DOCUMENTS 2202062  3/1987  United Kingdom.
2203869  8/1987  United Kingdom.

Primary Examiner—Michael R. Fleming
Assistant Examiner—Debra A. Chun
Attorney, Agent, or Firm—Baker, Maxham, Jester & Meador

[57] ABSTRACT

An apparatus and method for polling a plurality of components in a data processing system includes a sensor for determining when a request for power up has been made, a series of parallel circuits extending between a power sequence monitor/power control device and individual computer system components, a configuration bus connected between the system components and the power sequence monitor/power control device and comparison circuitry connected to the configuration bus for comparing a signal sent from the power sequence monitor/power control device, through the configuration bus and system components, and returned to the power sequence monitor/power control device, with a predetermined code for identifying and locating the system components.

4 Claims, 8 Drawing Sheets

EXAMPLE OF A CONFIGURATION BUS

CONFIGURATION BUS STRUCTURE

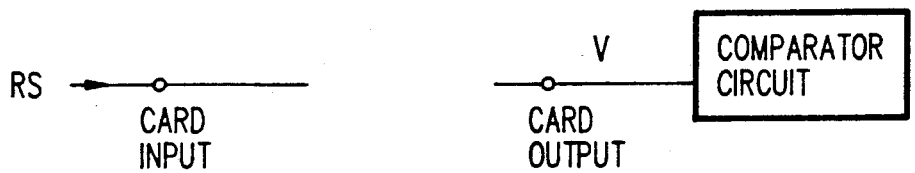
IF RS = '0', V = '0'
IF RS = '1'  V = '0'
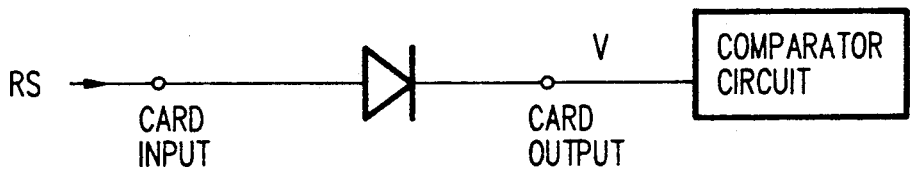
IF RS = '0', V = '0'
IF RS = '1'  V = '1'
CARD CIRCUIT DIAGRAM
FIG. 7

PRELIMINARY POLLING FOR IDENTIFICATION AND LOCATION OF REMOVABLE/REPLACEABLE COMPUTER COMPONENTS PRIOR TO POWER-UP

This is a continuation of application Ser. No. 07/292,199 filed Dec. 30, 1988.

BACKGROUND OF THE INVENTION

1. Technical Field

This invention relates generally to techniques for identifying what parts have been installed in a computer system, and more specifically to automated methods of determining the location and identification of physically interchangeable computer components.

2. Description of Related Art

In some computer systems, there can be many part numbers and/or Engineering Changes (EC) used for a single component. This is often particularly true with respect to memory components. It is also common practice to allocate card slots for special system feature cards that are not required for normal system operation, and the actual cards installed varies from machine to machine. The system must be able to accurately identify exactly what parts are installed for several reasons.

For instance, there may be several different memory card part numbers which can be installed in a given card location depending on the system configuration. These different card part numbers may all use the same interface chip part number. Such a multiple-use chip has unique register initialization requirements for each card part number in order to accommodate for the different memory array technologies, the clock speed, card densities, and the system that it is operating in. The same card may be used in multiple systems. One system may have single card operation. Another system may use two of the memory cards working as a pair and the two cards must be compatible. This concept of the multiple-use chip programmability feature is described more fully in pending application Ser. No. 206,757 entitled Smart Memory Card Architecture and Interface filed Jun. 15, 1988 and commonly owned by the assignee of the present application. Without proper compatibility, the card would not operate correctly. There is also an exposure (especially when dynamic RAM arrays are involved) that a part supplied with invalid initialization data could run out of specification without being detected by the system. The chip operates differently in each of these environments and the initialization data controls these operations.

There is also the possibility that there are different voltages and/or current requirements for each of the different configurations of the system based on the number and types of cards installed. It is therefore crucial to the power supply design to know what current limit is considered excessive for each of the configurations so that the voltage/current limits can be set appropriately for safety considerations and to prevent device burnout. On the other hand if the current limit is set too low for the configuration, power up may not complete without over-current sensors shutting down the power supply. This information may be needed prior to applying power to the parts in question. IBM Technical Disclosure Bulletin Vol. 29, No. 2 (July 1986) at p.806 describes a prior technique for avoiding overcurrent by measuring the current flow through sense resistors on each card. The present invention operates on a simpler premise and provides additional benefits and information at the same time.

The next point to consider is that the part information needed to identify the correct configuration data may be available the majority of the time to the bring-up controls. However, if a part is replaced there may be no guarantee that the update is made to the system configuration data or that the entry is done correctly. U.S. Pat. No. 4,556,953 discloses a system for identifying which of several possible interface cards is present, and provides for self-configuration of the system to accommodate the interchanging of circuit cards. However, several different circuits are required all of which use the system address/data bus, thereby creating priority problems as well as identifying the circuit cards after normal system power has been applied. These disadvantages have been avoided in the present invention.

Another factor to consider is the number of circuits as well as the number of input/output signals which are required in order to properly identify the type of circuit component installed as well as its location in the system.

OBJECTS AND SUMMARY OF THE INVENTION

In view of all the foregoing, it is an object of the invention to provide a method and apparatus for accurately identifying circuit components such as interface cards which are currently installed in a system. A related object is to also identify the installation location of circuit components which are physically capable of being installed in a number of different locations in the system.

Another object is to assure that proper initialization data is supplied to each part currently installed.

An additional important object is to identify component parts in a system prior to applying power to the operating functional circuits in the component part.

A further object is to be able to identify replaced or upgraded parts before they are actually activated for use. A related object is to know in advance the consequences which newly installed parts will have on existing parts before either the new parts or the existing parts have power applied to them.

Still another object is to provide in the preferred form of the invention a dedicated circuit which is used solely for identification and location of system components prior to applying power to the active circuits in the system components. A related object is to provide only passive circuit elements such as diodes or the absence of diodes which will provide an identification response to a polling signal.

Yet another object is to provide a single configuration bus which communicates with each position slot capable of holding a system component and which carries back either a null identification signal or an encoded identification signal for comparison to system configuration data contained in a reference such as an EEPROM.

Accordingly, the invention provides a series of parallel input circuit lines connectable to each circuit card or other component for carrying sequential polling signals, and further provides a single configuration bus connected to the output of passive circuit components located in such circuit card or other component. The unique identification number encoded in such passive circuit components is thereby transmitted along the configuration bus to a comparator whenever the slot holding such circuit card is polled by a query signal.

Thus, improper circuit components and/or improperly located circuit components are detected before any power is applied to the system. Additionally, initialization can be done based on the actual components installed in the system. This simple but comprehensive polling can be done every time a request is made to power up the computer system, and the reliability of the polling circuitry is virtually guaranteed since it is dormant during the normal operation of the system. Thus, any malfunction of the system is unlikely to cause any damage to the polling circuitry.

Although specific objects and summaries of the important features of this invention have been set forth above, it is understood that the scope of the invention will become apparent from the description given hereinafter and from the accompanying drawings. However, it should be understood that the details in this invention specification are given by way of example and illustration only, and various changes and modifications will become apparent to those skilled in the art, all within the spirit of the invention.

BRIEF DESCRIPTION OF DRAWINGS

FIG. 7 is a schematic diagram of each card circuit; and

DETAILED DESCRIPTION OF THE PREFERRED EMBODIMENT

Figure 1:
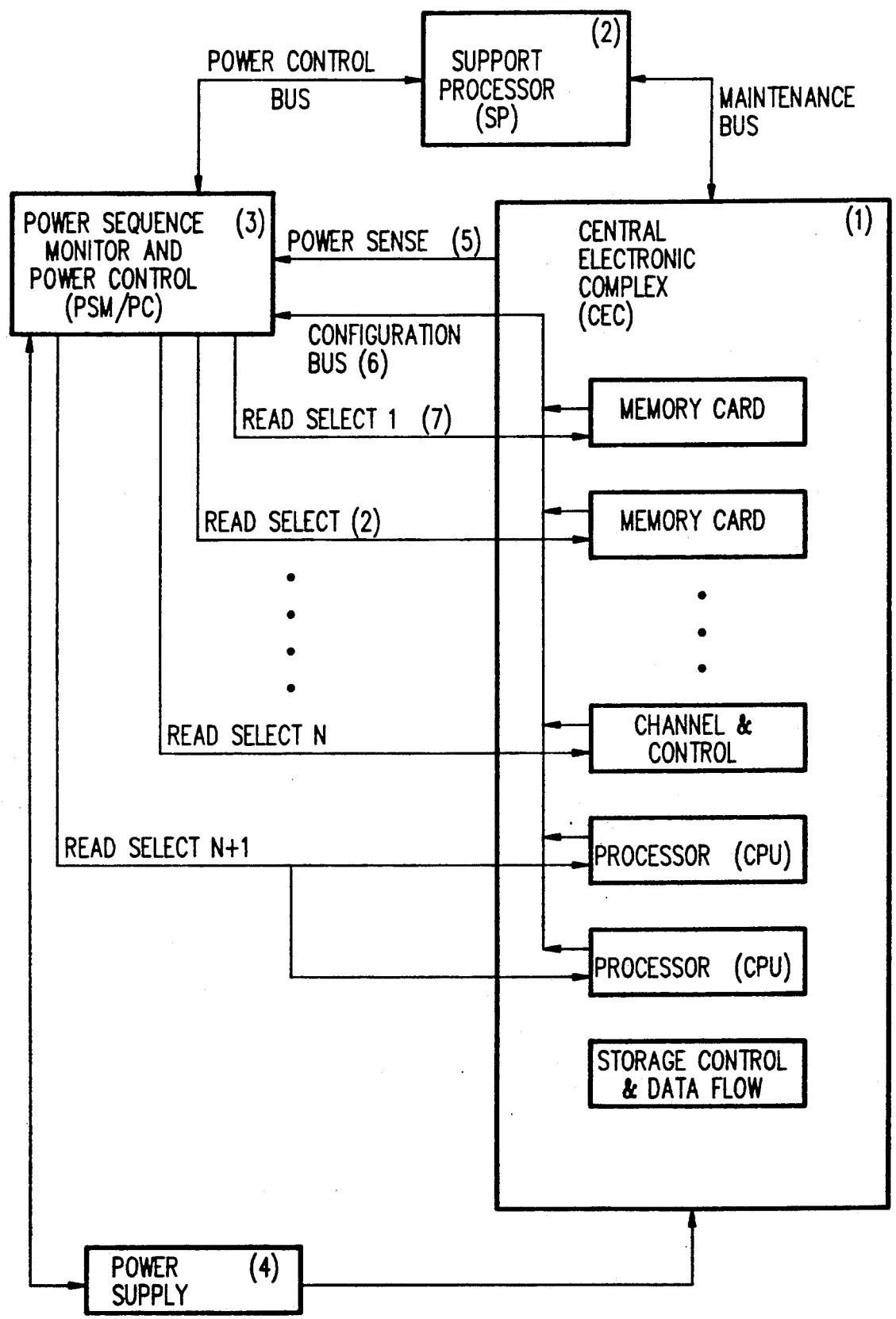
FIG. 1 is a block diagram showing a presently referred embodiment of the invention.

FIG. 1 shows the environment of the invention. The central electronic complex (CEC) (1) consists of the CPU, storage controls, memory, and channels/controls. The memory can exist in a variety of card options. Feature card slots can also exist such as: number of channels, number of memory cards, types of processor cards. The support processor (SP) (2) provides support for the CEC by performing a variety of tasks such as initiating the power on sequence, initializing components, and keeping track of the status of the machine. As used herein, "power on sequence" will refer to the period of time from when powering up of the CEC is desired to the time when the system is initialized and ready to run normal system functions. Power to the SP is required prior to the CEC being powered up and after the CEC power down is complete because the SP controls these functions. The power sequence monitor & power controls (PSM/PC) (3) is microprocessor driven and provides system power control to the CEC. The PSM provides AC/DC power on/off sequencing, system reset functions, and fault protection for the CEC.

With the rack Autoconfiguration of the present invention present, the PSM/PC performs internal RAM and ROM tests and monitors the SP printer interface or processor operator panel for a Power-on Request. The power sense lines (5) from the CEC (1) to the PSM (3) provides feedback to the PSM (3) to indicate if power faults exist and if so relays controls to the power supply (4) to shut down. The power supply (4) is controlled by the PSM/PC (3) to apply power to the CEC (1). FIG. 1 also shows the connection of the configuration bus (6) from the logic cards in the CEC (1) to the PSM/PC (3) and the read selects (RS) (7) from the PSM/PC (3) to the CEC (1).

Figure 2:
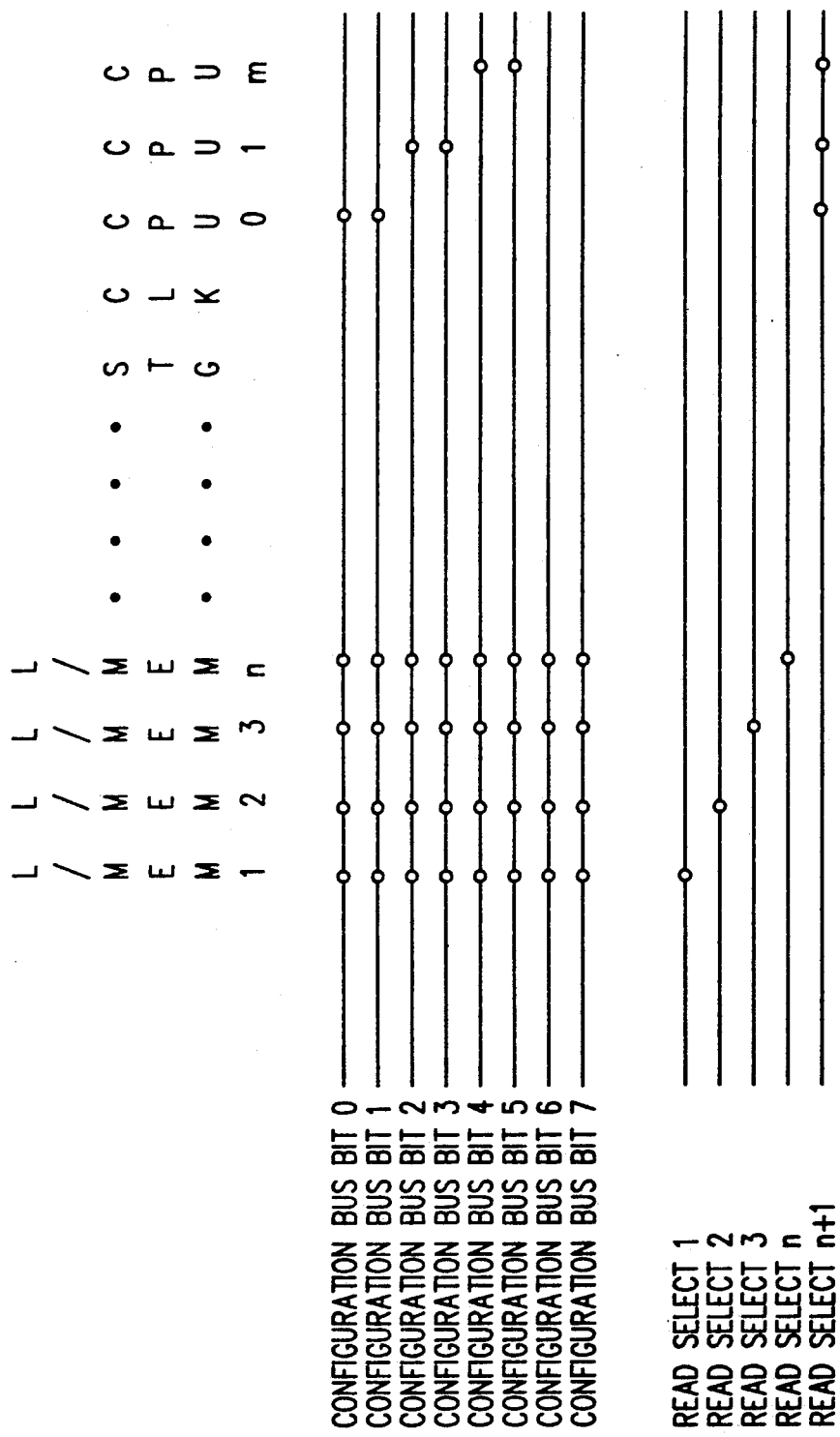
FIG. 2 shows the connection between and eight-bit configuration bus and various circuit components installed in a computer system.

FIG. 2 shows an example of a configuration bus connected up to a CEC. This shows an eight bit configuration bus with n plus one RS signals. There are 'n' logic/memory cards (thus 'n' RS) that are connected in parallel on the configuration bus but are read serially by activating one RS at a time. This also shows storage control and clock control cards that are not connected to the bus. There are also 'm' of the CPU cards that are each only connected to two of the configuration bus bits, and two CPU cards are not connected to the same configuration bus bits. All 'm' of the CPU cards are connected to the same RS so the data from these cards are collected simultaneously. The process of collecting this data is described more fully below.

Figure 3:
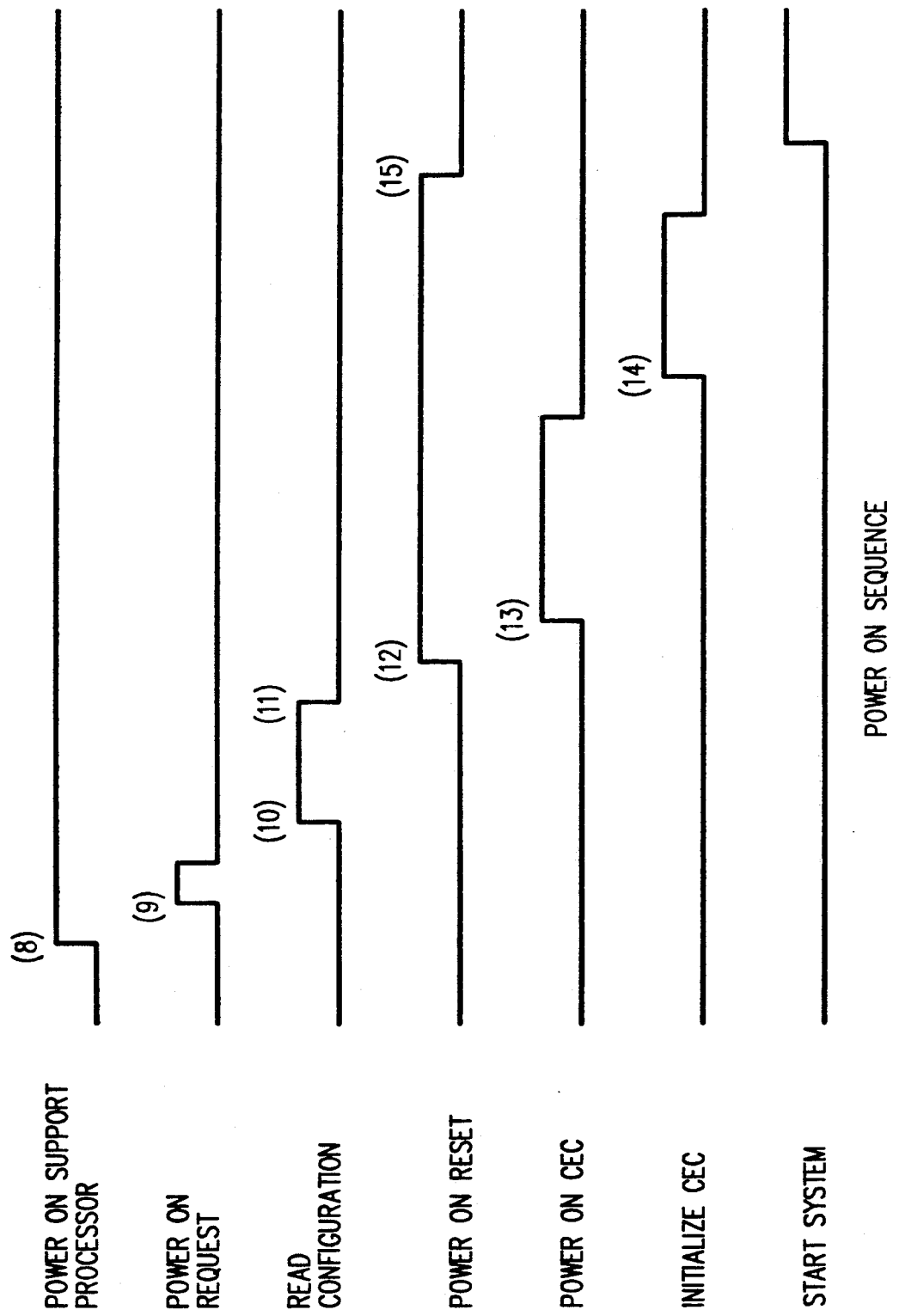
FIG. 3 is a timing diagram showing the power on sequence.

FIG. 3 shows the timing diagram of the power on sequence. The SP is powered on (8). When the SP power on is complete, a power on request is issued from the SP to the PSM (9). The PSM then reads the system configuration data from the configuration bus (10). The power on reset protective circuitry (12) is activated to prevent device burnout while the power is ramping up. This remains active while power is applied to the CEC (13) until the CEC is initialized to a reset state (14). After this procedure is complete the system operations can begin.

Figure 4:
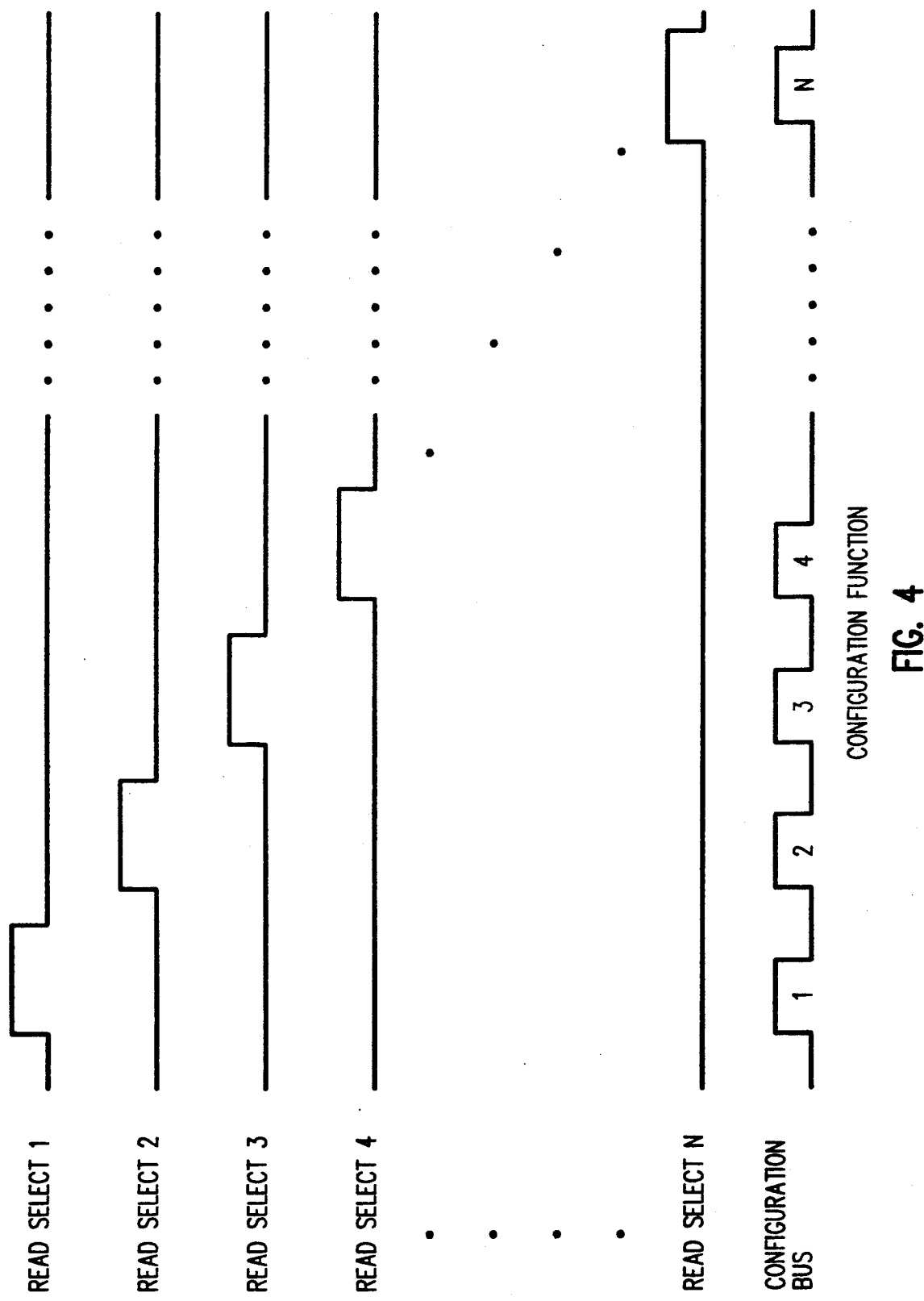
FIG. 4 is a timing diagram showing the configuration function.

FIG. 4 shows how the configuration data is read. It is an expanded view of the time between points 10 and 11 in FIG. 3. Each of the RS, 2 thru n, is activated one at a time from the PSM/PC to the cards in the CEC. When RS1 is activated, only the card(s) that have RS1 as an input are able to put the data on the configuration bus. Sequentially, the rest of the RS are activated.

Figure 5:
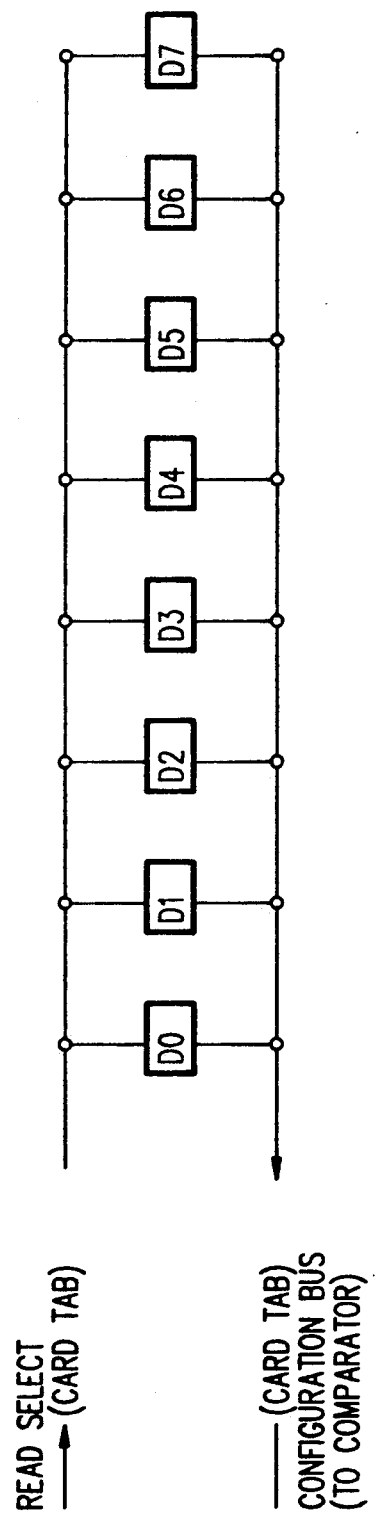
FIG. 5 is a schematic circuit diagram of the physical card representation.
Figure 6:
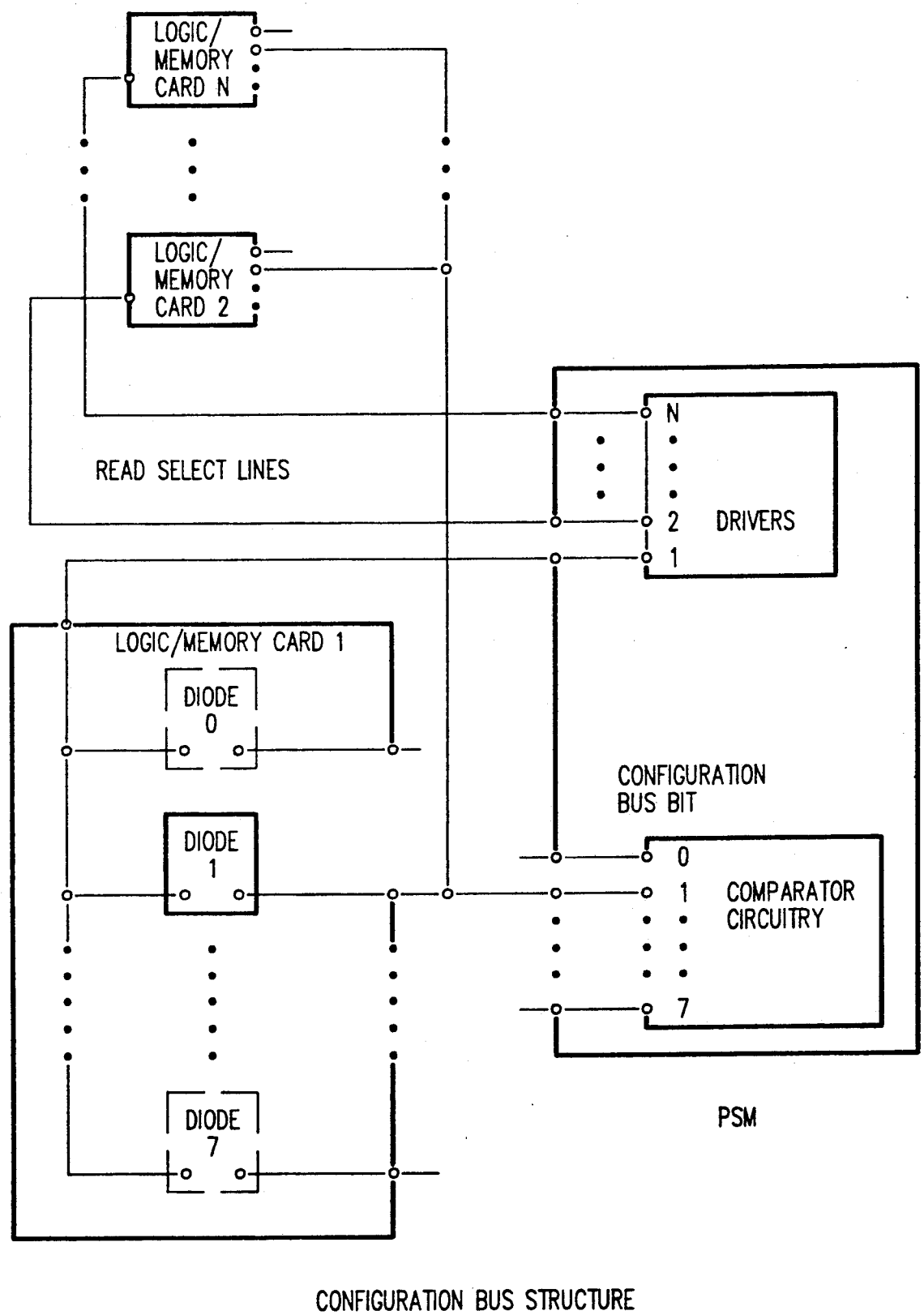
FIG. 6 is a block diagram showing the configuration bus structure.

FIG. 5 is an expanded view of the connection to the configuration bus of the memory/logic cards. One of the pins is the RS pin (read select) which is the card input for the polling mechanism. The other eight pins are the output pins whose logical state depends on the contents of the boxes labeled D0-D7 in FIG. 5. One of the pins can be used as a parity bit for cards. Each of these pins has a binary value and the eight bits will be encoded to represent one of 256 possible card parts, if parity is not used, or one of 128 possible card parts, if parity is used. If a mismatch is detected between the EEPROM data and the data obtained via this polling mechanism, the parity bit is a means to identify if a fault occurs in this polling mechanism. Because of the polling mechanism used, multiple cards can be connected to the same eight bit bus provided that each card sharing a particular bit of the bus has its own RS as shown in FIG. 2. The bus structure is used to connect the outputs for the program pins from the memory/logic cards together. The bus structure is possible if a circuit such as the following is used.

The card portion of the invention is implemented by simple circuitry incorporating diodes or the like. The RS signal is a memory card input supplied by the PSM and is connected to a card output pin via a diode or an open circuit as shown in FIG. 3. The binary value of each pin is achieved by either having a diode present (logical 1) or not having the diode present, thus leaving an open circuit (logical 0). The RS signal is activated (plus V equals 1) to only one of the cards sharing the pin buss. The remainder of the cards sharing the buss would have the RS inactive leaving the eight program pin outputs for each of those three cards at a logical 0. The card with the RS active would keep the net at logical 0 if the diode is absent or would force the net to a logical 1 if the diode was present.

Figure 8:
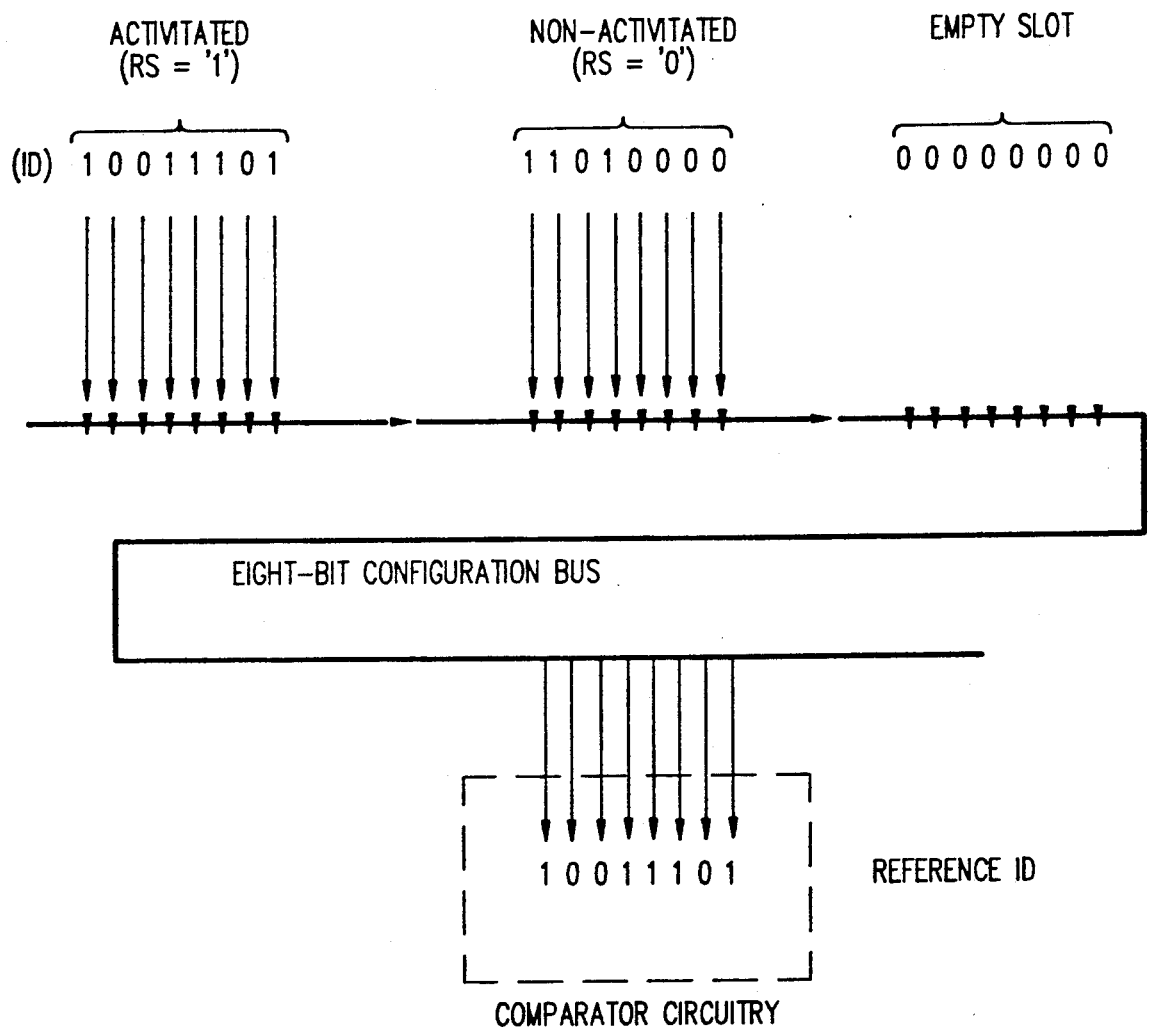
FIG. 8 is a schematic diagram showing the comparator function.

The value read from the eight pins from one card are then used by the system to determine the type of memory card in the slot that corresponds to the active RS. System software will decode this input and compare it to the EEPROM data (see FIG. 8). If the two agree, the corresponding Engineering Data Table (which contains the program register data that is to be used to initialize the card) is located and, if required, the power supply voltage/current limits will be set. This diode decode to program register loading action is key to taking the generic memory array cards and turning each of them into the many application specific memory cards based on attributes such as the type of array, the amount of memory on the card, the system cycle time, and the design level.

Only one RS can be activated at a time to a set of cards that share the common bus. The polling process is complete after all RSs have been activated one at a time. This polling action occurs using only power from the power sense monitor card and may therefore take place before power is applied to the memory cards.

In general the method of this invention could be applied to identifying any combination of features in a system.

It will be understood by those skilled in the art that the invention described herein may be changed and modified all within the spirit of the invention. Such variations are not to be regarded as a departure from the invention and all such modifications as would be obvious to one skilled in the art are intended to be included within the scope of the following claims.

We claim as our invention:

1. A method for applying power to electronic components located in electronic component locations in a central electronic complex including a support processor and a power supply means for selectively providing power to the electronic component locations, the method including the steps of:
   issuing a power on request signal from the support processor to the power supply means;
   in response to the power on signal and prior to delivery of power to the component locations, sending a sequence of read select signals from the power supply means to the electronic component locations, each read select signal being provided to a respective component location;
   in response to the sequence of read select signals, sending from each electronic component location of a plurality of component locations to the power supply means a sequence of identification signals which identify an electronic component at the electronic component location; and
   in response to each sequence of identification signals, providing from the power supply means a power signal to the electric component location from which the sequence of identification signals was received.

2. The method of claim 1 further including the steps of:
   programming the power supply means with a plurality if configuration signals, each of the configuration signals identifying a respective type of electronic component;
   and wherein the step of providing a power signal includes:
   in response to a sequence of identification signals received from a component location, identifying an electronic component at the component location by comparing the sequence of idenfication signals with the plurality of configuration signals; and
   in response to the identification of the electronic component, setting the current level of the power signal provided to the component location to a predetermined level based on the electronic component type.

3. The method of claim 1 wherein the step of providing a power signal includes providing a plurality of power signals, each power signal being provided to a respective component location from which a sequence of identification signals was received; and
   in response to the plurality of power signals, initially setting the central electronic complex to a reset state.

4. In a central electronic complex including a plurality of electronic component locations and a support processor means for initiating the delivery of power to the complex, a power delivery system comprising:
   sensing means connected to the support processor for receiving a power up signal;
   configuration bus means for conducting a sequence of signals from each component location;
   read select bus means for conducting a read select signal to each component location;
   means responsive to the power up signal for providing a sequence of read select signals on the read select bus means;
   means in an electronic component at a component location for generating a sequence of identification signals on the configuration bus in response to a read select signal;
   power level means for generating a power level signal in response to the sequence of identification signals, the power level signal being conditioned to represent a power current level for a type of electronic component corresponding to the electronic component; and
   power supply means responsive to the power level signal for providing power at the power current level to the component location.

* * * * *